United States Patent Office 3,637,574
Patented Jan. 25, 1972

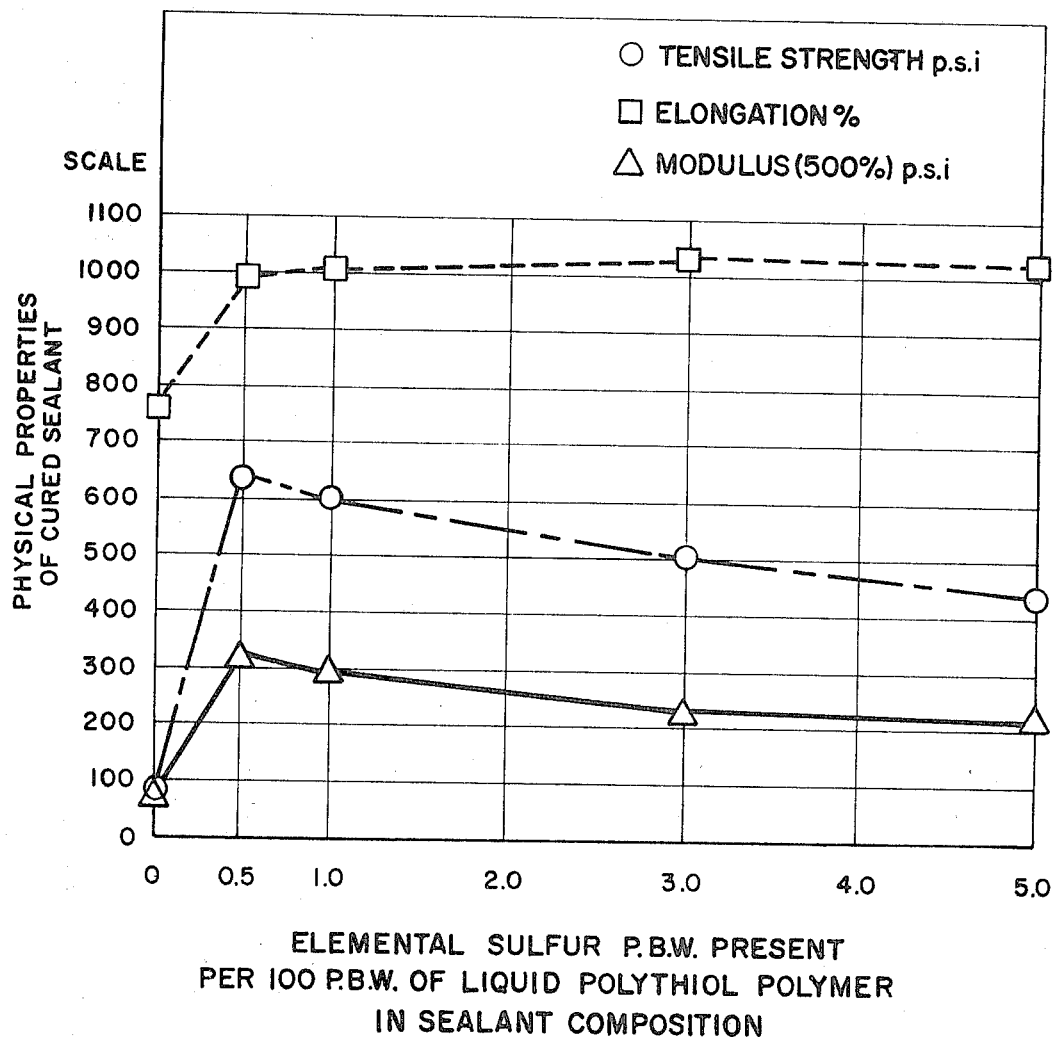

3,637,574
SULFUR MODIFIED ZINC COMPOUND/TETRA-
ALKYLTHIURAM POLYSULFIDE CURE SYSTEM
FOR LIQUID POLYTHIOL POLYMERS
Edward G. Millen, Princeton, N.J., assignor to Thiokol
Chemical Corporation, Bristol, Pa.
Filed Jan. 16, 1969, Ser. No. 791,681
Int. Cl. C08g 25/00
U.S. Cl. 260—37 R                                    13 Claims

ABSTRACT OF THE DISCLOSURE

Room temperature cured sealant composition having greatly improved physical properties is obtained by curing a curable polymeric sealant composition comprising a liquid polythiol polymer, e.g. —SH terminated liquid polysulfide polymer, by means of a curing agent system comprising a zinc compound and a tetraalkylthiuram polysulfide essentially modified by the addition of up to about 10 parts by weight of sulfur per 100 parts by weight of the polymer. The cured composition has utility as a sealant for waterproofing, caulking and similar applications where a relatively rapid room temperature cure is desired.

BACKGROUND OF THE INVENTION

Field of the invention

The invention relates to a relatively rapidly curing, room temperature curable sealant composition comprising a —SH terminated organic polymer and a curing agent system for the polymer which comprises a combination of zinc oxidizing compound and thiuram polysulfide curing agents. The present invention is an improvement of such a system.

Description of the prior art

Many —SH terminated organic polymers are known in the art. Of particular interest to the practice of the present invention are liquid polythiol polymers having various backbones, such as hydrocarbon, alkylene polysulfide, polyether, and polyurethane. —SH terminated liquid polysulfide polymers are of most interest herein.

—SH terminated polysulfide polymers are characterized by the fact that they have recurring polysulfide linkages between organic radicals having at least two primary carbon atoms for connection to disulfide linkages. Thus, for example, disulfide polymers have a general structure corresponding to the formula

HS(RSS)$_x$RSH in which the R's are organic polyvalent radicals, preferably predominantly divalent alkylene oxahydrocarbon or thiahydrocarbon radicals such as diethyl formal radicals, and $x$ is a number greater than one, which may vary from a relatively small number in the case of liquid polymers having a molecular weight of about 500 to 12,000, e.g., about 3 to 100 where R is (CH$_2$CH$_2$), to a relatively large number in the case of solid polymers which may have a molecular weight of about 100,000 to several million. The low molecular weight polysulfide polymers, e.g., 500 to 12,000, are normally liquids at 25° C. and are preferably formed by reaction of an organic dihalide with a backbone corresponding to R with an inorganic polysulfide, such as Na$_2$S$_y$, y usually being greater than two. Solid organic polysulfide polymers are produced thereby which may then be split according to the method of Patrick and Ferguson in U.S. 2,466,963 to provide liquid polythiol polymers. The present invention concerns the curing of such liquid polythiol polymers, and in particular their controlled working and curing in the presence of an added amount of elemental sulfur at room temperature in compositions intended for sealant purposes.

Methods and materials for effecting the vulcanization of liquid polythiol polymers have heretofore been proposed. Thus, for example, metal oxide curing agents for —SH terminated liquid polysulfide polymers have been suggested in the aforementioned patent to Patrick and Ferguson and in the Patrick U.S. patents, 2,195,380 and 2,206,643. Further, the use of zinc compounds, sulfur and of thiuram monosulfide in a curing agent system for a polysulfide type synthetic rubber polymer is taught in U.S. 2,701,192, vulcanization being achieved by applying heat to a shaped mass held under pressure in a die. However, the latter system has been found unsuitable for attaining the objectives of the present invention, as shown below.

SUMMARY OF THE INVENTION

The present invention is directed to improving significantly the physical properties, e.g. tensile strength, elongation and modulus, of the product made from a —SH terminated organic polymer composition which can be cured for sealant applications such as for architectual and automotive sealing and glazing and which can be applied and cured relatively fast at ambient atmospheric temperatures, for example, in about ¾ to 1 hour at about 70–75° F.

The objects of the invention are achieved by the inclusion of a physical properties-improving amount of elemental sulfur in a flowable, curable sealant composition comprising liquid polymer and a curing system for the polymer which curing system essentially contains a tetraalkylthiuram polysulfide, particularly tetramethylthiuram disulfide, and an inorganic metal curing agent compound, particularly, zinc peroxide or zinc oxide in combination with plasticizers, fillers, setting rate retarders or working life extenders, and other ingredients usually included in sealant formulations. For storage and shipping purposes, the components are grouped into two or, if desired, more, sub-combinations of the various components which then may be packaged separately. The amount of elemental sulfur is from a trace to about 10 parts, and preferably at least from about 0.01 to about 0.5 part, by weight per 100 parts by weight of polythiol polymer in the composition. To form the flowable, curable sealant composition, the ingredients are simply mixed together, stirred to homogenize them, and then the composition is ready to apply to a substrate, such as a concrete joint or a window pane. Setting begins within a few minutes in the presence of moisture absorbed from the surrounding atmosphere and curing is substantially completed in less than 1 hour in most cases.

BRIEF DESCRIPTION OF THE DRAWING

The effectiveness of elemental sulfur for significantly improving the tensile strength, elongation and modulus physical properties of a cured polythiol polymer sealant composition which is cured by means of a mixture of zinc oxidizing compound and tetraalkylthiuram polysulfide curing agents according to the invention is shown in the drawing. In the drawing, the test results of Examples 1 to 5, wherein all the ingredients were the same in identities and amounts except for the sulfur amount which was varied from 0 to 5 parts by weight, as described more fully below, are shown plotted against the parts by weight (p.b.w.) of elemental sulfur present in the uncured sealant composition per 100 parts by weight of liquid polythiol polymer present therein. It is seen that the addition of 0.5 part by weight of elemental sulfur to a previously sulfur-free composition raises tensile strength from a value of 70 p.s.i. to a value of 630 p.s.i.; elongation from a value of 750% to a value of 980%; and modulus at 500% from a value of 60 p.s.i. to a value of 310 p.s.i. Also, it is seen that increasing the amount of elemental sulfur present in the composition increases elongation slightly while simultaneously causing the tensile strength and modulus to decline somewhat in value, but not as low as the corresponding values of the sulfur-free composition.

DESCRIPTION OF THE PREFERRED EMBODIMENTS

In order to point out more fully the invention in its practical aspects, the following specific description and illustrative examples are given of the practice of the invention for preparing the sub-combinations and combinations of the ingredients used in their various phases.

The invention is illustrated by means of two representative, commercially available —SH terminated liquid polysulfide polymers, LP–2 and LP–32. The polymer LP–2 has the formula

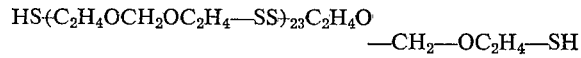

HS$(C_2H_4OCH_2OC_2H_4$—SS$)_{23}C_2H_4O$
—$CH_2$—$OC_2H_4$—SH a molecular weight of 4000, and 2% of branching in the side chains. The polymer LP–32 has a similar formula and molecular weight but differs from LP–2 in having 0.5% branching in the side chains. LP–32 polymer yields cured elastomers having softer body and greater elongation than does LP–2 polymer.

While the invention is illustrated with the above two liquid polysulfide polymers, it is to be understood that the invention may be practiced with other polythiol reactants, such as those described more fully below.

EXAMPLES 1–5

The effect on the physical properties of room temperature cured polythiol polymer of the addition of 0.5 to 5 parts by weight of sulfur per 100 parts of LP–32, —SH terminated liquid polysulfide polymer, to a composition containing the polymer and cured by means of a zinc compound and a tetramethylthiuram disulfide curing agents system is shown by the following Examples 1–5. In each example, the flowable, room temperature curable sealant composition was prepared by homogeneously mixing together the listed ingredients at room temperature, about 70 to 75° F., charging the uncured mixture into a caulking gun, and extruding and forming the composition to make test pieces which, after curing at room temperature, were tested in accordance with the test methods described in ASTM D412–64T, "Tension Testing of Vulcanized Rubber." The test pieces were allowed to stand exposed to the atmosphere at ambient atmospheric temperature, about 70–75° F., until cured. The compositions as prepared and cured and the physical properties as found for the cured test pieces were as follows:

|  | Example Number | | | | |
|---|---|---|---|---|---|
| Ingredients | 1 | 2 | 3 | 4 | 5 |
|  | Parts by weight | | | | |
| —SH terminated polysulfide polymer, LP–2 | 100 | 100 | 100 | 100 | 100 |
| Calcium carbonate (filler) | 30 | 30 | 30 | 30 | 30 |
| Titanium dioxide (pigment, filler) | 10 | 10 | 10 | 10 | 10 |
| Hi Sil 233 (silica filler) | 3 | 3 | 3 | 3 | 3 |
| Stearic acid (set retarder) | 0.5 | 0.5 | 0.5 | 0.5 | 0.5 |
| Zinc peroxide | 10 | 10 | 10 | 10 | 10 |
| Tetramethylthiuram disulfide | 3 | 3 | 3 | 3 | 3 |
| Aroclor 1254 (chlorinated biphenyl) | 13 | 13 | 13 | 13 | 13 |
| Sulfur (elemental) | 0 | 0.5 | 1 | 3 | 5 |
| Physical properties: | | | | | |
| (a) Mixed and cured at 70–75° F.: | | | | | |
| Work life, minutes | 16 | 19 | 18 | 20 | 11 |
| Cure time, minutes | 45–60 | 45–60 | 45–60 | 45–60 | 45–60 |
| Shore "A" Hardness | 50 | 47 | 48 | 50 | 50 |
| (b) Aged 1 week at 75° F.: | | | | | |
| Tensile strength, p.s.i. | 70 | 630 | 600 | 500 | 430 |
| Elongation, percent | 750 | 980 | 1,000 | 1,030 | 1,020 |
| Modulus (500%), p.s.i. | 60 | 310 | 290 | 220 | 210 |
| Shore "A" Hardness | 46 | 48 | 48 | 47 | 47 |
| (c) Exposed to 158° F. for 1 week: | | | | | |
| Tensile strength, p.s.i. | 190 | 600 | 640 | 550 | 460 |
| Elongation, percent | 550 | 950 | 1,000 | 960 | 930 |
| Modulus (500%), p.s.i. | 190 | 320 | 350 | 290 | 280 |
| Shore "A" Hardness | 51 | 50 | 52 | 50 | 50 |

The test results show the highly beneficial effects of the inclusion of as little as 0.5 part of elemental sulfur in the curable polysulfide polymer-containing composition. Thus, by comparing the results obtained in Example 1 (no elemental sulfur present) with the results of Example 2 (0.5 part of elemental sulfur present), it is found that comparative samples aged for 1 week at 75° F. show that the sulfur-containing composition has a 900% increase in tensile strength, a 130% increase in elongation, a 500% increase in modulus (tensile stress in pounds per square inch at the indicated elongation percentage), and substantially little change in durometer hardness (Shore "A" hardness). Further, the test data show that whereas the sulfur-free control sample (Example 1) increased in tensile strength and modulus and decreased in percent elongation on further aging at 158° F. for 1 week, the elemental sulfur-containing samples (Examples 2–5) retained substantially the same tensile strengths, percent elongations and moduli on such further aging at 158° F. as they had after 1 week of aging at 75° F. In the tests, the Shore "A" hardness increased 2 to 4 points for Examples 2–5, as compared to an increase of 5 points for Example 1. It is to be further noted that the Shore "A" hardnesses of unaged test pieces after 45 to 60 minutes of curing at 75° F. are substantially the same as after the total two week period of aging at 75° F. and 158° F., indicating substantially no age hardening.

EXAMPLE 6

The room temperature curing rate and the physical properties of the compositions of the present invention as shown in Examples 2–5 in contrast to a somewhat similar mixture of molding ingredients taught in the prior art is shown by the following comparative data:

Simulated prior art composition (U.S. 2,701,192)

Ingredients: Parts by weight
Liquid polysulfide polymer,[1] LP–2 _____ 100
Sulfur _____ 4
Zinc oxide _____ 3
Zinc stearate _____ 2
Tetramethylthiuram monosulfide _____ 0.3
Benzothiazyl disulfide _____ 2.6
Dibutyl phthalate _____ 6.6

[1] The patent teaches organic polysulfide rubber generally. LP–2 is used herein by way of an example of a species of a —SH terminated liquid polysulfide polymer, which, of course, is not a rubber until cured.

Physical properties after mixing and holding at 75° F.

Work life—7 days
Cure time—7 days
Tackfree time—7 days
Body structure—Fluid

After standing 1 day at room temperature, the above mixture formed a skin on the surface, but the main body of the composition was still fluid. After 7 days, the skin formation had attained a thickness of 1/16 inch, but the main body of the mixture was still fluid. Thus, it will be apparent to one skilled in the sealant art, that the sealant composition of the present invention is drastically different from that of the simulated prior art composition.

EXAMPLE 7

For most industrial and architectural applications it is more convenient and preferable to premix and package the ingredients of the curable sealant composition in the form of a two part system, herein designated as Part A and Part B, respectively. Part A comprises the liquid polythiol polymer and the sulfur and other ingredients such as fillers, plasticizers, pigments and so on, excepting specifically the curing agents. Part B comprises the curing agents and sufficient plasticizer compound to form a flowable mass. A typical two part, two package system may be prepared by formulating Parts A and B as follows:

Part A

| Ingredients: | Parts by weight |
|---|---|
| Liquid polythiol polymer, LP–32 | 100 |
| Calcium carbonate (filler) | 75 |
| Titanium dioxide (pigment) | 15 |
| Aroclor 1254 (chlorinated biphenyl) | 50 |
| Bentone 34 (thixotropic agent) | 5 |
| Sulfur (elemental) | 0.5 |
| Stearic acid (set retarder) | 0.75 |

Part B

| Ingredients: | Part by weight |
|---|---|
| Zinc peroxide | 10 |
| Tetramentylthiuram disulfide | 3 |
| Aroclor 1254 (plasticizer) | 13 |

Typical characteristics of sealant composition after mixing

| Work life, hours | 1.5 at 70–75° F. |
|---|---|
| Cure time, hours | 2.5 at 70–75° F. |
| Tackfree time, hours | 4 at 70–75° F. |
| Shore "A" hardness | 40 at 70–75° F. |

Liquid polythiol polymers of various types are known in the prior art, of which the following are typical and may be used in the practice of the invention:

(A) Liquid polyalkylene polysulfide polymers having —SH terminals prepared as described in U.S. Pat. 2,466,963, above, and which have molecular weights of the order of 500 to 25,000 and which are viscous liquids having viscosities within the range of 300 to 100,000 centipoises at 25° C. Such liquid polymers can be cured rapidly by the curing agents system disclosed therein to form solid elastomers having excellent resistance to acids, alkalis, petroleum hydrocarbons and atmospheric oxidation as well as improved physical properties. They have been found especially useful in providing sealants having good adhesion to metal surfaces. Thus the cured compositions may be used as sealants for sealing panes of glass to metal window frames and as caulking for stormwindow joints. The commercially important liquid polymers of this type are particularly described in articles by Fettes and Jorzcak, published in "Industrial and Engineering Chemistry," vol. 42, page 2217 (1950), and vol. 43, page 324 (1951). They are generally prepared from bis-beta-chloroethyl formal and are essentially composed of recurring $\pm$(SCH$_2$CH$_2$—OCH$_2$OCH$_2$CH$_2$S$\pm$ groups and have free mercapto terminals through which they may be cured to form a solid elastomer. In the manufacture of these commercial polymers, a small percentage of trichloropropane is commonly mixed with the bis-beta-chloroethyl formal to provide a slightly cross-linked structure upon cure. Particularly commercially valuable polymers include those having preferably recurring groups, such as bis-(ethyleneoxy)oxymethane, bis(butyleneoxy)methane, bis-(ethylene)oxy, and bis(butylene)oxy and an average molecular weight of approximately 2,000 to 10,000 and preferably 3,500 to 8,000.

(B) Liquid —SSH terminated high rank polysulfide polymers prepared as described in U.S. Pat. 3,331,818 by reacting the conventional liquid polysulfide polymers of U.S. 2,466,963 as described above with elemental sulfur. The resulting products have a sulfur rank of about 1.6 to 5.0 and preferably about 2.5 to 3.5 and at least some sulfur linkages which contain more than two sulfur atoms. They may be cured relatively rapidly by using the curing agent of this invention to form solid elastomers having greater solvent resistance than the conventional low rank cured polysulfide polymers described under (A). The polymers may also be in a blocked form wherein the —SSH terminals are blocked with aldehydes or ketones as described in S.N. 661,128, filed Aug. 16, 1967.

(C) Liquid —SH terminated polyethers such as —SH terminated polypropylene glycol as disclosed in U.S. Pat. 3,258,495.

(D) —SH terminated hydrocarbon polymers such as —SH terminated polybutadiene (Chem. & Eng. News, Apr. 4, 1966, page 37), —SH terminated butadiene/acrylonitrile copolymers and the alkanepolythiol, aralkanepolythiol, and arenepolythiol polymers disclosed in U.S. Pats. 2,230,390; 2,436,137; and 3,243,411.

(E) Liquid —SH terminated polyurethanes such as disclosed in U.S. patent application S.N. 484,097, filed Aug. 31, 1965.

(F) Liquid —SH terminated poly(alkylene sulfide) polymers as disclosed in U.S. Pats. 3,056,841 and 3,070,-580.

(G) Other polythiol polymers as disclosed in U.S. patent applications S.N. 484,105; S.N. 484,118 (now abandoned); and S.N. 484,122, all filed Aug. 31, 1965.

The tetraalkylthiuram polysulfide used in practice of the invention is well-known as a sulfur-donor or sulfur-yielding compound which is used in the rubber vulcanizing art. While the tetramethylthiuram disulfide has been used to illustrate the invention, it is to be understood that other tetraalkylthiuram polysulfides may also advantageously be used, particularly those represented by the formula

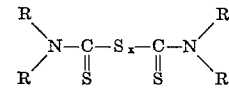

wherein $x$ is 2, 3 or 4, and wherein R represents an alkyl or cycloalkyl group containing up to and including 10 carbon atoms, and the R's attached to a terminal nitrogen atom can be joined to form with said nitrogen atom a heterocyclic structure. Examples of such compounds are tetramethylthiuram disulfide, tetraethylthiuram trisulfide, tetraamylthiuram disulfide, tetradecylthiuram disulfide, tetraoctylthiuram disulfide, tetracyclohexylthiuram disulfide, dipentamethylenethiuram tetrasulfide, and the like.

The zinc compound used in practice of the invention preferably is an oxygen bearing compound, preferably zinc oxide or zinc peroxide. It has been found that the zinc cation is essential for obtaining the curing and that the anion of the zinc compound, while having a rate modifying effect, is less important. Thus, zinc salts of fatty acids, e.g. zinc stearate or zinc oleate, may also be used, particularly when a slower cure rate is desired than that provided by use of zinc peroxide or zinc oxide as a component of the curing agent sub-composition of the invention. Zinc oxide provides a slower cure rate than does the zinc peroxide.

The elemental sulfur which may be used according to the teachings of the present invention can be any of the commonly available forms of monomeric or polymeric elemental sulfur, or other chemicals or chemical compositions which would provide elemental sulfur under the normal conditions of use for compositions of the type described herein. Such sources of elemental sulfur would include, therefore, rhombic, monoclinic and amorphous sulfur. Useful compositions may be prepared according to the present invention which may contain from about 0.01 to about 10 parts by weight of the elemental sulfur per 100 parts by weight of polymer. In order to obtain the most useful compositions which will provide a desired balance of relatively fast cure time for the composition and improved physical properties in the cured systems, the preferred amount of sulfur to be used is about 1 to 3 parts by weight. For the same reasons the preferred amounts of zinc compound curing agent to be used, per 100 parts by weight of polymer is about 4 to 10 parts by weight, and of tetraalkylthiuram polysulfide is about 5 to 15 parts by weight.

In addition to the components mentioned above, the compositions of the present invention may also contain various other adjuvants commonly employed in elastomer based sealants without detracting from the usefulness of the compositions for the herein described purposes. Such adjuvant materials should be essentially inert with respect to the components mentioned above.

The compositions may contain, therefore, one or more materials useful as fillers, pigments, and/or reinforcing agents such as carbon black, clays, slate flour, limestone, calcium carbonate, asbestine, aluminum oxide, titanium dioxide, zinc sulfide, silicon dioxide, magnesium silicate, iron oxide and rayon floc. In general the use of these materials tends to decrease the elongation and increase the Shore hardness, toughness and tensile strength of the cured polymer systems. Up to about 500 parts by weight of such materials may be used per 100 parts by weight of polymer.

Other plasticizers than the disclosed chlorinated biphenyls may also be used and include other phthalates, e.g. dibutyl phthalate and butyl benzyl phthalate; polyalkylene glycol dibenzoate and dipropylene glycol dibenzoate; di-(butoxy-ethoxy-adipate); di(butoxy-ethoxy-ethyl) formal; and tricresyl phosphate. Preferably the plasticizer is a chlorinated biphenyl. The plasticizers should preferably be aromatic in nature to insure physical compatability with the other organic components of the compositions. From about 25 to 200 parts by weight of the plasticizers may be used per 100 parts by weight of polymer.

Adhesive additives, such as organo silane compounds, and the phenolic and epoxy resins may also be used in amounts of up to about 10 parts by weight per 100 parts by weight of polymer.

Other additives that may be used, depending on the application, are cure accelerators, ultra violet light stabilizers, thixotropic agents, cure retarders and leveling agents.

Generally, it is desirable that the amount of curing agents used be present in at least stoichiometric amounts relative to the polythiol polymer, in order to provide complete cure of the sealant composition.

The solid ingredients of the compositions are obtained and used as commercially available finely divided particles, e.g. powders having a particle size of 100 mesh U.S. Standard mesh or finer. For purposes of package stability, it is preferable that the materials used be substantially dry as commercially available. Thus, they may contain a total of less than 0.3% by weight of moisture and produce a uniformity of performance and stability.

In preparing sub-compositions, such as the sub-compositions, Parts A and B of Examples 6 and 7, the fillers, plasticizers, pigments, and other non-reactive ingredients may be apportioned between the polymer-containing part and the curing agent-containing part of the sealant composition. Preferably sufficient plasticizer and filler will be mixed with the curing agent ingredients to form a flowable curing paste which will readily mix with the polymer-containing portion.

The term "room temperature" as used in the above description is intended to mean an ambient atmospheric temperature of about 70–75° F. The ambient atmospheric temperature can vary from about freezing temperature to about 150° F. without adversely affecting the curing of the sealant composition. The curing rate will be somewhat slower at temperatures below 70° F., and it will be much more rapid at 150° F. However, by varying the amount of curing agents used, one skilled in the art will be able to adjust the formulations of the sub-compositions to obtain a desired fast curing rate in accordance with the invention.

For uses where toxicity is to be avoided in the use of the compositions or in handling of the finished product, the ingredients may be selected to meet any regulator toxicity standards which must be met while still obtaining the advantages and benefits of the invention.

The ranges of the amounts of the various ingredients which may be used advantageously to prepare a room temperature curing sealant composition according to the invention are as follows:

| Ingredients: | Parts by weight |
| --- | --- |
| Liquid polythiol polymer | 100 |
| Zinc compound curing agent | 3 to 15 |
| Tetraalkylthiuram polysulfide | 3 to 18 |
| Sulfur, elemental | 0.01–10 |
| Plasticizers | 25–200 |
| Fillers, pigments, adhesives, or other sealant composition additives | 50–500 |

The physical and chemical properties of the cured composition of the present invention may be varied by varying the amounts of the various ingredients used per 100 parts of the liquid polythiol polymer while retaining the advantages and benefits provided by the presence of the elemental sulfur.

In general, the cured sealant composition of the invention will have a tensile strength in the range of 400 to 700 p.s.i., elongation of 800 to 1100%, modulus at 500% of 200 to 350 p.s.i., Shore "A" hardness in the range of 40 to 60, as determined by methods described in ASTM D412–64T, "Tension Testing of Vulcanized Rubber."

The compositions and methods of the invention provide means for preparing by simple mixing and relatively rapidly curing to a substantially tackfree state at room temperature, i.e. within about 45 to 60 minutes, an elastomeric product which has utility for a variety of sealant or caulking purposes. However, the product and the method of its preparation also are useful for industrial and commercial applications where a room temperature setting composition is needed and where heat-based curing methods and systems are not practical. Thus, the flowable composition of the invention may be used to prepare a relatively quick-setting leak-seal for a metal or plastic container wall. It also may be used as a potting compound. It may be used for preserving perishable field speciments by casting or flowing the composition into a cavity or around the specimen in the field. The cured composition can later be removed. It also may be used in police work for casting replicas of tire tracks and footprints. Other uses will be evident to workers in many arts.

Many modifications and variations of the present invention will be obvious to those skilled in the art of formulating and curing liquid polythiol polymers. It is therefore to be understood that such other modifications and variations that fall within the scope of the claims hereof are intended to be included therein.

I claim:

1. An ambient atmospheric temperature curable sealant composition having improved physical properties comprising liquid polythiol polymer, a curing amount of combined curing agents for said polymer comprising essentially at least one zinc compound curing agent and tetraalkylthiuram polysulfide curing agent, and a physical properties improving amount of elemental sulfur.

2. The composition of claim 1 wherein the amount of sulfur is from about 0.01 to 10 parts by weight per 100 parts by weight of said polymer.

3. The composition of claim 1 wherein the liquid polythiol polymer is a —SH terminated liquid polysulfide polymer represented by the formula HS($C_2H_4OCH_2OC_2H_4$—SS)$_{23}C_2H_4O$—
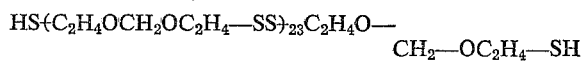

and having a molecular weight of 4000 and from 0.5 to 2% of branching in the side chains.

4. The composition of claim 1 wherein the zinc compound curing agent is selected from zinc peroxide and zinc oxide.

5. The composition of claim 1 wherein the tetraalkylthiuram polysulfide is a polysulfide represented by the formula

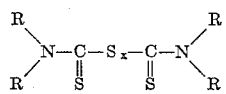

wherein $x$ is 2, 3 or 4, and wherein R represents an alkyl or cycloalkyl group containing up to and including 10 carbon atoms, and the R's attached to a terminal nitrogen atom can be joined to form with said nitrogen atom a heterocyclic structure.

6. The method of forming a cured shaped article in a relatively short period of time at ambient atmospheric temperature which comprises (a) homogeneously mixing together to form a flowable composition:
a measured quantity of liquid polythiol polymer, and per 100 parts by weight of said polymer, the following ingredients by weight:
from 0.01 to about 10 parts of sulfur,
from 25 to 200 parts of plasticizer compound, and
from 50 to 500 parts of fillers, pigments, adhesives or other sealant composition additives;

(b) mixing into said flowable composition a curing amount of a curing agent system for said polymer comprising zinc compound curing agent and tetraalkylthiuram polysulfide;

(c) shaping the resulting composition to form said shaped article; and (d) maintaining said shaped composition at ambient atmospheric temperature while it cures to a substantially tackfree state.

7. The method of claim 6 wherein the tetraalkylthiuram polysulfide is a polysulfide represented by the formula

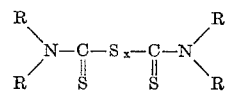

wherein $x$ is 2, 3 or 4, and wherein R represents an alkyl or cycloalkyl group containing up to and including 10 carbon atoms, and the R's attached to a terminal nitrogen atom can be joined to form with said nitrogen atom a heterocyclic structure.

8. The method of claim 6 wherein the liquid polythiol polymer is a —SH terminated liquid polysulfide polymer represented by the formula SH($C_2H_4OCH_2OC_2H_4$—SS)$_{23}C_2H_4O$—
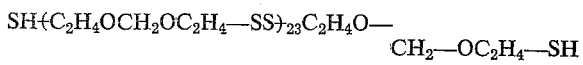

and having a molecular weight of 4000 and from 0.5 to 2% of branching in the side chains.

9. The method of claim 6 wherein the zinc compound curing agent is an oxygen containing zinc compound selected from zinc peroxide and zinc oxide.

10. A cured shaped article made by the method of claim 6.

11. The composition of claim 1 wherein the liquid polythiol polymer is a polysulfide polymer.

12. The composition of claim 6 wherein the liquid polythiol polymer is a polysulfide polymer.

13. The composition of claim 1 wherein the amount of sulfur is from about 1 to 3 parts by weight per 100 parts by weight of said polymer.

References Cited

UNITED STATES PATENTS

| | | | |
|---|---|---|---|
| 1,634,925 | 7/1927 | Whitby | 260—567 |
| 3,046,248 | 7/1962 | Molnar | 260—79.1 X |
| 3,053,816 | 9/1962 | Stone | 260—79.1 |
| 3,213,105 | 10/1965 | Gruber | 260—79 X |
| 3,219,638 | 11/1965 | Warner | 260—79 |
| 3,431,239 | 3/1969 | Morris et al. | 260—37 |
| 3,499,864 | 3/1970 | Millen | 260—37 |

OTHER REFERENCES

Adolfas Damusis, ed.: Sealants, Reinhold Publishing Corporation, New York, published Oct. 17, 1967 (TP988D3 in A.U. 145), pp. 176–179.

MORRIS LIEBMAN, Primary Examiner
S. M. PERSON, Assistant Examiner

U.S. Cl. X.R.
260—79